US008324302B2

(12) United States Patent
Asokan et al.

(10) Patent No.: US 8,324,302 B2
(45) Date of Patent: Dec. 4, 2012

(54) INSULATING COMPOSITION AND METHOD FOR MAKING THE SAME

(75) Inventors: Thangavelu Asokan, Bangalore (IN); Sujatha Pushpakanth, Bangalore (IN); Shalini Thimmegowda, Bangalore (IN)

(73) Assignee: General Electric Company, Niskayuna, NY (US)

( * ) Notice: Subject to any disclaimer, the term of this patent is extended or adjusted under 35 U.S.C. 154(b) by 185 days.

(21) Appl. No.: 12/707,689

(22) Filed: Feb. 18, 2010

(65) Prior Publication Data

US 2011/0198545 A1 Aug. 18, 2011

(51) Int. Cl.
*C08K 3/18* (2006.01)

(52) U.S. Cl. ......... 524/430; 252/572; 252/570; 252/573

(58) Field of Classification Search ................... 524/430
See application file for complete search history.

(56) References Cited

U.S. PATENT DOCUMENTS

| | | | | |
|---|---|---|---|---|
| 1,925,142 | A | 9/1933 | Hallett | |
| 3,878,160 | A * | 4/1975 | Grazen et al. | 523/158 |
| 4,031,059 | A * | 6/1977 | Strauss | 523/179 |
| 4,360,706 | A | 11/1982 | Lanfranconi et al. | |
| 5,785,789 | A * | 7/1998 | Gagnon et al. | 156/235 |
| 2006/0083851 | A1 * | 4/2006 | Yan et al. | 427/96.2 |
| 2008/0152898 | A1 * | 6/2008 | Donzel et al. | 428/323 |
| 2011/0017494 | A1 * | 1/2011 | Asokan et al. | 174/137 B |

FOREIGN PATENT DOCUMENTS

| | | | |
|---|---|---|---|
| JP | 5198208 | A | 8/1993 |
| WO | WO2009049481 | A1 | 4/2009 |

* cited by examiner

*Primary Examiner* — Doris Lee
(74) *Attorney, Agent, or Firm* — Scott J. Asmus

(57) ABSTRACT

A method is provided that includes providing a resin in liquid form. The resin can be partially cured, and subsequent to partially curing the resin, the resin can be mixed with filler particles. The resin and filler particles can be mixed, say, in a planetary mixer, and can be exposed to an ambient pressure less than atmospheric pressure during mixing. Subsequent to mixing the resin and filler particles, the resin can be fully cured. The fully-cured resin can be disposed between first and second conductive components configured to be maintained at different potentials, such as between a phase conductor and a ground conductor.

21 Claims, 6 Drawing Sheets

INSULATING COMPOSITION AND METHOD FOR MAKING THE SAME

BACKGROUND

Embodiments of the invention relate generally to insulating compositions, and in particular to insulating compositions for use in high voltage devices.

Conventional insulation used in products such as motors and generators typically include several components, such as enamel, tapes, and resin. As such, conventional insulation tends to be a complicated system. Further, each of the constituent components is expected to exhibit different electrical, thermal, and mechanical properties, making overall insulation performance difficult to predict.

One of the major performance parameters is being monitored is the partial discharge magnitude. Partial discharges largely tend to occur at structural defects such as voids, delaminations, and cracks in the insulation. The partial discharges in these defects are caused by the lower dielectric constant at the defects due to the presence of air, compared to that of the surrounding solid insulation materials. The lower dielectric constant leads to a higher impedance and voltage in the localized defect region, and hence leads to partial discharges. Consequences of such partial discharges include changes in the chemistry due to oxidation or carbonization and subsequently treeing, cracking, and eventual catastrophic failure of the insulation.

BRIEF DESCRIPTION

In one aspect, a method is provided that includes providing a resin in liquid form. The resin may be a dielectric, and can, for example, include one or more of a thermoplastic resin, a thermosetting resin, or an elastomeric resin. In some embodiments, a hardener can be mixed with the liquid resin. The resin can be partially cured, say, through the application of thermal energy, for example, so as to form a semisolid.

Subsequent to partially curing the resin, the resin can be mixed with filler particles, for example, sufficiently to disperse the filler particles within the resin so as to have a level of uniformity of at least one on the Morishita index. The resin and filler particles can be mixed, say, in a planetary mixer, and can be exposed to an ambient pressure less than atmospheric pressure during mixing.

The filler particles may define voids. For example, the filler particles can include hollow spheres of glass, hollow spheres of polymer, hollow spheres of aluminum oxide, hollow spheres of silicon dioxide, hollow spheres of titanium dioxide, and/or hollow spheres of zinc oxide. The filler particles can be substantially spherical, substantially spheroidal, substantially ovoidal, and/or substantially egg-shaped, with respective diameters of about 100 μm or less. The resin can also be mixed with second filler particles, which can include a ceramic, a varistor, and/or an inorganic dielectric.

Subsequent to mixing the resin and filler particles, the resin can be fully cured. Overall, the resin can be provided in liquid form at a first temperature, the resin can be partially cured by exposing the resin to a second temperature greater than the first temperature, the resin and filler particles can be mixed while exposing the resin to a third temperature less than the second temperature, and the resin can be fully cured by exposing the resin to a fourth temperature less than the second temperature. In some embodiments, the fourth temperature may be about equal to room temperature.

The fully-cured resin can be disposed between first and second conductive components configured to be maintained at different potentials. For example, the first conductive component can include a phase conductor and the second conductive component can include one of a phase conductor or a ground conductor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
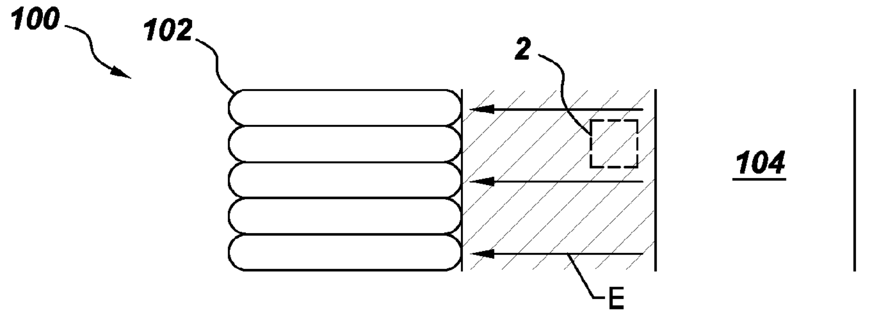
FIG. 1 is a magnified side view of a portion of a high voltage system configured in accordance with an example embodiment, showing an insulation layer between a phase conductor and a ground conductor.

Example embodiments of the present invention are described below in detail with reference to the accompanying drawings, where the same reference numerals denote the same parts throughout the drawings. Some of these embodiments may address the above and other needs.

Referring to FIG. 1, therein is shown a portion of an electrical system 100 configured in accordance with an example embodiment. The system 100 can include a first conductive component, such as a phase conductor 102, and a second conductive component, such as a ground conductor 104. The phase conductor 102 can connect to a high voltage supply. During operation of the generator 100, the phase conductor 102 and the ground conductor 104 can be maintained at different potentials. For example, the phase conductor 102 may be held at a high voltage through the operation of the excitation source, while the ground conductor 104 may be held at ground potential. As such, an electric field E may be established between the phase conductor 102 and the ground conductor 104.

Figure 2:
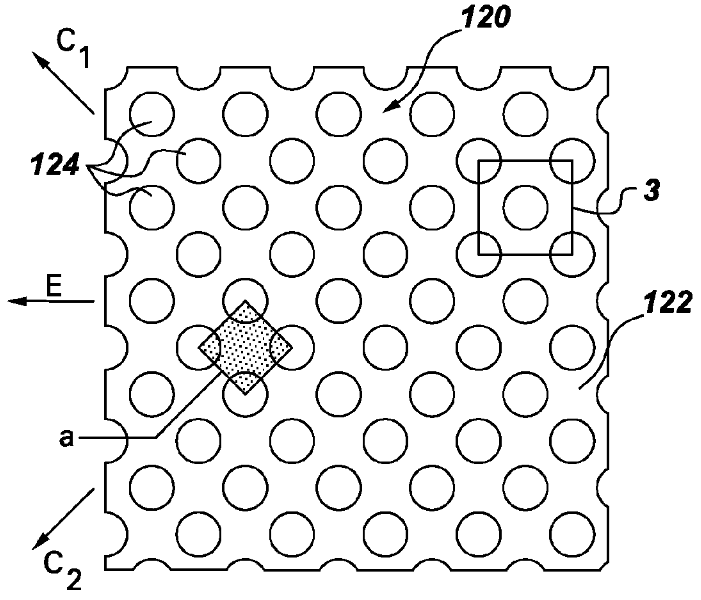
FIG. 2 is a magnified side view of the region labeled "2" in FIG. 1.

Referring to FIGS. 1 and 2, an insulation layer 120 can be disposed between the 102 and 104, thereby providing some amount of electrical isolation between the two. During operation of the generator 100, the electric field E established by the 102 and 104 can extend across the insulation layer 120. The insulation layer 120 may include a matrix 122 formed at least partially of dielectric material. For example, the dielectric matrix material may include a thermoset (e.g., epoxy, polyester resin, and/or the like), a thermoplastic (e.g., the polycarbonate resin marketed by SABIC Innovative Plastics (Pittsfield, Mass.) under the trademark LEXAN), an elastomer (e.g., silicone), and/or a blend or composite of the above.

Figure 3:
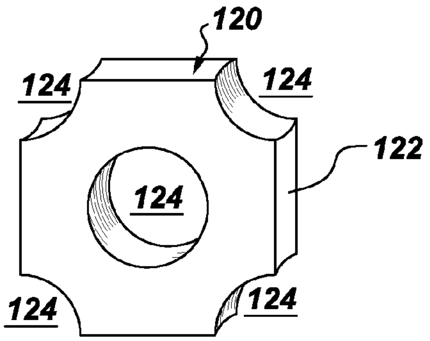
FIG. 3 is a magnified perspective sectioned view of the region labeled "3" in FIG. 2.
Figure 4:
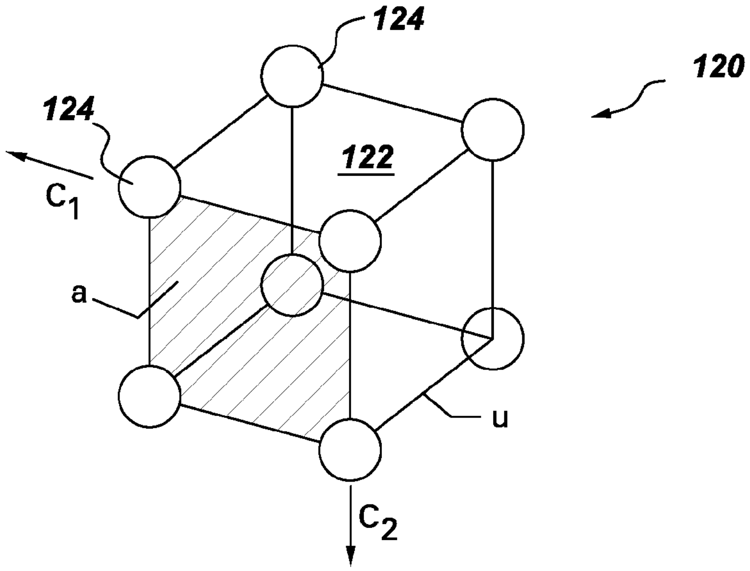
FIG. 4 is a magnified perspective view of a portion of the insulation layer depicted in FIG. 2, the matrix material being transparent to reveal a unit cell of voids.
Figure 5:
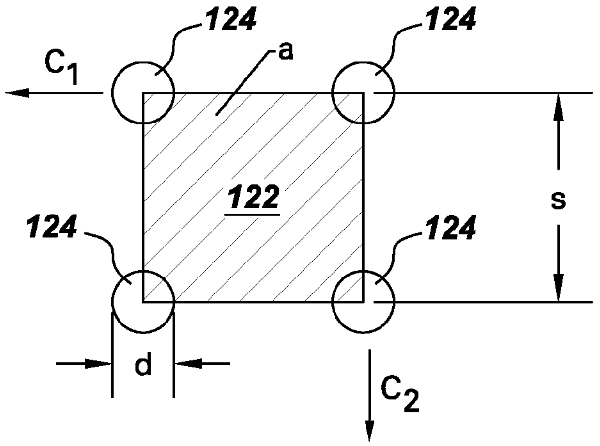
FIG. 5 is a side view of the unit cell of FIG. 4.
Figure 6:
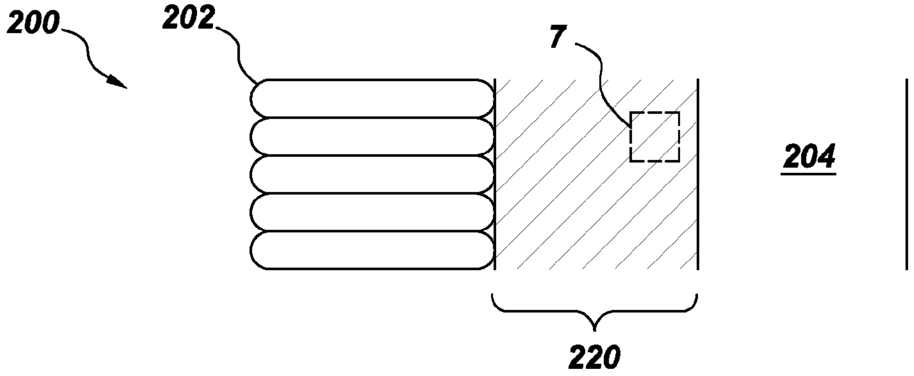
FIG. 6 is a side view of a high voltage device configured in accordance with another example embodiment.
Figure 7:
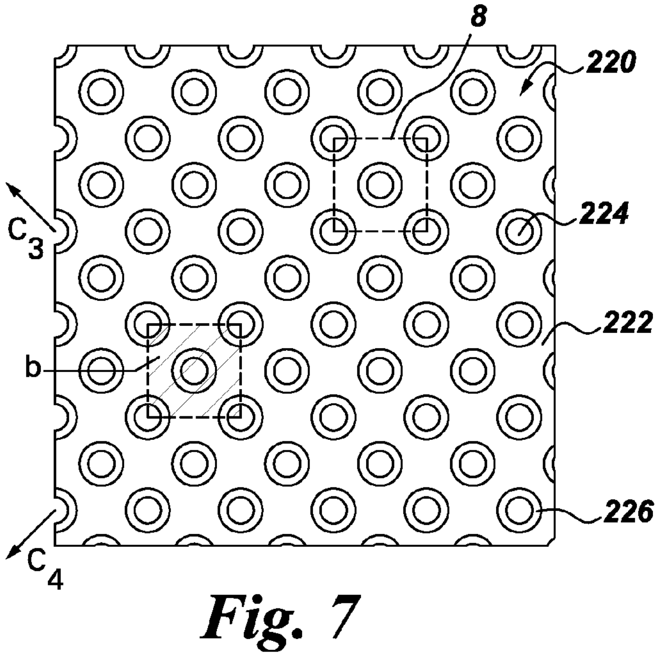
FIG. 7 is a magnified side view of the region labeled "7" in FIG. 6.
Figure 8:
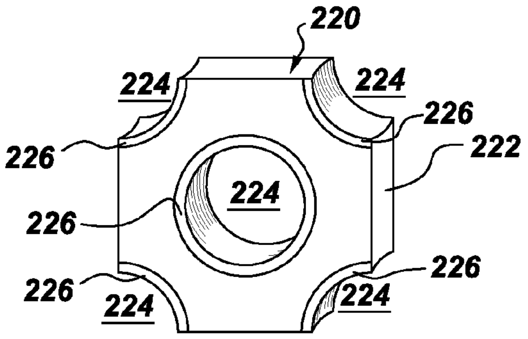
FIG. 8 is a magnified perspective sectioned view of the region labeled "8" in FIG. 7.

Referring to FIGS. 2-5, the matrix 122 may define multiple voids 124 therein, the voids being of substantially uniform respective dimension. For example, the matrix 122 may incorporate an aerogel or a xerogel. The voids 124 may be substantially spherical and may all have diameters d of about 100 μm (say, ±10%), or may substantially uniformly have diameters of some dimension less than 100 μm, say, on the order of 10 μm or 1 μm. In other embodiments, the voids 124 may be substantially spheroidal, ovoidal, egg-shaped, and/or the like. Voids of other shapes may also be possible. Further, the voids 124 can be configured as a substantially uniform array. The array may be of any of a variety of ordered arrangements, and may, for example, consist of the spatial repetition of a unit cell u that is cubic (as shown in FIG. 3), tetragonal, orthorhombic, monoclinic, triclinic, hexagonal, or rhombohedral. The matrix 122 can define the voids 124 such that the level of uniformity of the void array is at least one on the Morishita index.

Regardless of the type of symmetry generally exhibited by the array of voids, the array may have a "close-packed direction" along which the voids 124 are most closely spaced. For some arrangements of the voids 124 (e.g., the arrangement of FIGS. 2-5), the resulting array may possess several close-packed directions $c_1$, $c_2$. The spacing s of adjacent voids 124 along the close-packed directions $c_1$, $c_2$ can be less than or equal to an average diameter of the voids (i.e., $s \leqq d$). In some embodiments, the spacing s may be significantly smaller than the void diameter d; for example, s may be equal to about 0.3 d or less.

The insulation layer 120 can be configured such that, when disposed between 102 and 104, the void array is oriented with at least one of the close-packed directions $c_1$, $c_2$ oblique relative to the direction of the electric field E established by and extending between 102 and 104. This can be done, for example, by ensuring that the void array is appropriately oriented with respect to the outer contours of the insulation layer 120. As will be discussed further below, configuring the void array such that a close-packed direction thereof is oblique relative to the electric field passing through the insulation and void array may prove useful in some situations. In some embodiment, the close-packed direction may be oriented at an angle of 45 degrees or less with respect to the direction of the electric field E.

Referring to FIGS. 6-10, in another embodiment of an electrical system 200, an insulation layer 220 may be disposed between a phase conductor 202 and another phase conductor 204. The phase conductors 202 and 204 can be configured to be held at different electric potentials during operation, such that an electric field extends between the two and across the insulation layer 220. The insulation layer 220 may include hollow particles, such as hollow spheres 226, that are disposed within respective voids 224, such that each void 224 includes a hollow sphere 226. The voids 224 can have respective diameters d, and the spheres 226 can have respective outer diameters $d_s$ that are about equal to d, such that the unoccupied space associated with each void is essentially defined by an interior or hollow portion of the sphere (i.e., the spatial region that is not occupied by solid material is disposed essentially entirely within the sphere). The hollow spheres 226 may have a thickness t that is significantly less than the diameter d of the voids 224. Therefore, whether or not the voids 224 contain hollow spheres 226, the effective diameter of the voids may remain essentially the same, that is, d. The hollow particles/spheres 226 may be electrically non-conductive, and may be cenospheres, such as glass micro spheres, in which case the insulation layer 220 may be considered a variety of syntactic foam. In other embodiments, the hollow particles may be made at least partially of polymer (e.g., a phenolic), aluminum oxide, silicon dioxide, titanium dioxide, and/or zinc oxide.

Figure 9:
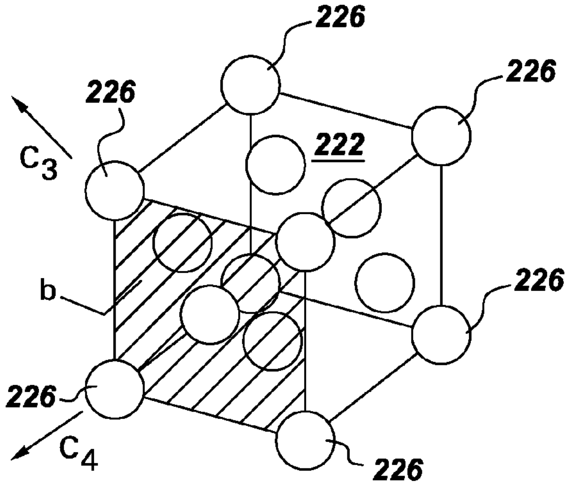
FIG. 9 is a magnified perspective view of a portion of the insulation layer depicted in FIG. 7, the matrix material being transparent to reveal a unit cell of voids.
Figure 10:
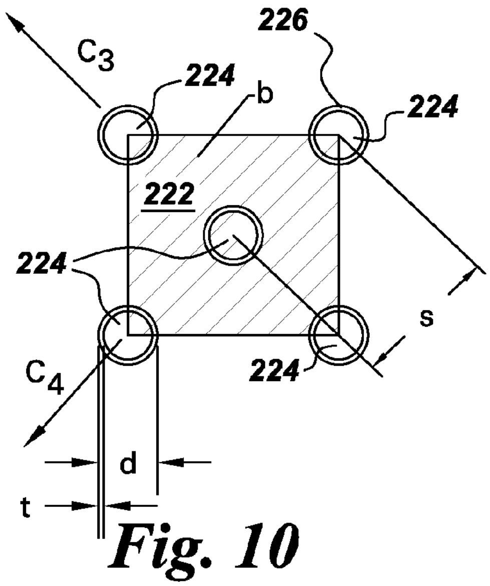
FIG. 10 is a side view of the unit cell of FIG. 9.

The voids 224 can be configured as a substantially uniform array having one or more close-packed directions. For example, the voids 224 may be arranged in a face-centered cubic pattern, as shown in FIG. 9, with close-packed directions $c_3$, $c_4$. Again, the spacing s of adjacent voids 224 along the close-packed directions $c_3$, $c_4$ may be less than or equal to an average diameter d of the voids, and at least one of the close-packed directions $c_3$, $c_4$ may be oblique relative to the direction of the electric field established by and extending between 202 and 204.

Applicants have observed that an insulation layer configured as described above (e.g., the insulation layer 220 of FIG. 6) may tend to exhibit an enhanced resistance to the occurrence of partial discharges within the insulation. Specifically, Applicants have observed that, for insulation having about 15% (by volume) cenospheres incorporated within a matrix of dielectric material, where the cenospheres are arranged as a substantially uniform array having a close-packed direction oriented obliquely relative to an electric field extending across the insulation, the voltage drop across the insulation layer required to initiate the onset of partial discharges is increased by more than 50% with respect to an insulation layer composed of the same dielectric material but lacking the void array.

Figure 11:
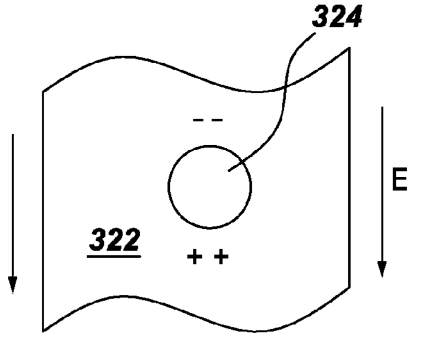
FIG. 11 is a schematic side view of an insulation layer including an isolated void and subjected to an external electric field.

Without wishing to be held to any particular theory, Applicants postulate that the definition within the dielectric matrix material of a uniform array of appropriately spaced voids allows for interactions of the induced charges that otherwise naturally accumulate at the surfaces of the voids under the influence of an external electric field. Specifically, referring to FIG. 11, for an isolated spherical void 324 in a dielectric matrix 322 subjected to an external electric field E, opposing charges are expected to respectively accumulate at opposing ends of the void. This arrangement of charges results in a maximum local electric field being disposed across the void 324, which can ultimately lead to electrical breakdown of the space within the void, for example, due to ionization of the gas particles in the void. It is noted that isolated voids as in FIG. 11 are expected to be found randomly throughout an insulation layer in the absence of complicated and expensive insulation manufacturing processes aimed at their exclusion.

Figure 12:
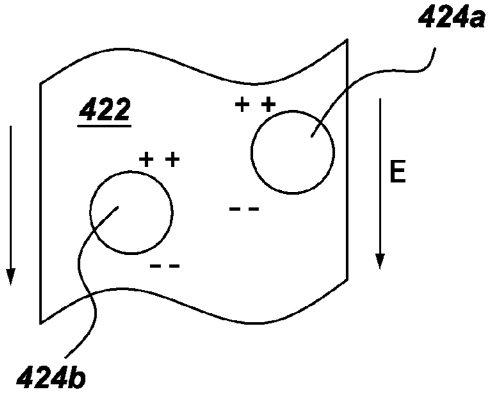
FIG. 12 is a schematic side view of an insulation layer including an array of voids and subjected to an external electric field.

Referring to FIG. 12, instead of an isolated void, a dielectric matrix 422 may contain a substantially uniform array of voids, including voids 424*a*, 424*b*. Again, when the matrix 422 is immersed in an electric field E, charges will accumulate around the voids 424*a*, 424*b*. If the voids 424*a*, 424*b* are sufficiently proximal (e.g., spacing $s \leqq$ void diameter d), the charges associated with one void 424*a* can interact with the charges associated with a neighboring void **424*b*. As a result, the charges may shift with respect to the voids 424*a*, 424*b* as each set of charges is attracted towards the other. (A "shift" in the charges in this case means movement of the charges relative to the distribution expected around an isolated void of similar size and shape.) This spatial redistribution of charges can lead to a reduction of the strength of the local electric fields across the voids 424*a*, 424*b*, with a corresponding increase in the strength of the local electric field extending through the matrix 422** between the voids. In light of the greater breakdown strength typically exhibited by solid dielectric materials, this can lead to a greater overall resistance to partial discharge in the matrix-void composite insulation.

It is noted that for an idealized arrangement of voids in which void size and spacing is perfectly uniform, the above described charge redistribution may not be expected to take place. Instead, the forces acting on a set of charges due to charges around a neighboring void could, in some cases, be exactly balanced by opposing forces exerted by charges located around a void disposed in an opposite direction. However, in reality, neither the size nor the spacing of the voids will be perfectly uniform, but instead will demonstrate some level of natural/statistical variation. The use of the term "substantially uniform" in the above descriptions of the void size and spacing is meant to be representative of this natural variability.

Figure 13:
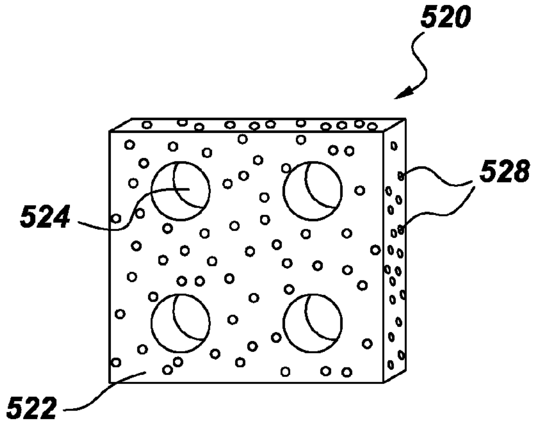
FIG. 13 is a sectioned perspective view of an insulation layer configured in accordance with another example embodiment.

Referring to FIG. 13, therein is shown a slice of insulation material 520 configured in accordance with another example embodiment. The insulation material 520 includes a matrix material 522, which may be composed at least partially of a dielectric. The matrix 522 can define a plurality of voids 524 arranged so as to form a substantially uniform array. The matrix 522 may incorporate therein particles 528, which particles may tend to enhance the thermal and/or electrical performance of the matrix. For example, at least some of the particles 528 may include a ceramic or inorganic dielectric material, which may enhance the thermal conductivity of the matrix 522.

In some embodiments, the matrix 522 may incorporate particles 528 that include varistor material, such as doped zinc oxide and/or doped titanium oxide ($TiO_2$). The varistor particles 528 may have a current ($I_{VAR}$)-voltage (V) behavior that is non-linear and described by the equation $$I_{VAR}=k\cdot V^{\alpha}$$

where $\alpha$ is a material-dependent non-linearity index that is in the range of 10 to 40 and k is a material-dependent proportionality constant. Where $\alpha \geqq 10$ (e.g., doped ZnO or doped $TiO_2$), the varistor particles 528 would therefore tend to be relatively non-electrically conductive when subjected to voltages and electric field strengths below a threshold voltage/field strength defined by the material, and would be relatively electrically conductive above the threshold. The electric field strength at which the transition in conductive behavior occurs is referred to as the "transition field strength." For many materials, the transition field strength will actually be a range of strengths over which the behavior changes from non-conducting to conducting.

The concentration and material of the varistor particles 528 can be configured such that, when the insulation material 520 is immersed in a uniform external electric field of increasing strength, the local electric field through the matrix material 522 reaches the transition field strength for the varistor particles 528 prior to the local electric field across any of the voids 524 reaching a strength sufficient to induce a partial discharge. For example, if the electrical stress necessary to initiate partial discharges is 3 kV $mm^{-1}$, and this electrical stress is found when the voltage drop across the insulation layer is 300 V for a 100 μm insulation thickness, the concentration of varistor particles 528 may be selected such that a voltage of 300 V results in a current density of 1 mA $cm^{-2}$ or more being conducted through the particles. In that way, a leakage current through the matrix 522 may be induced to alleviate charge accumulation, this having less deleterious effects than a partial discharge event. In some embodiments, the concentration of varistor particles 528 incorporated within the matrix material 522 can be less than or equal to about five weight percent of the aggregate.

One process for producing an insulation material configured in accordance with an example embodiment (e.g., the insulation material 220 of FIGS. 6-10) is now presented. First, granules of polycarbonate resin can be mixed manually with a selected quantity of hollow microspheres. The relative amounts of resin and hollow microspheres can be selected so as to produce an aggregate insulation material with an average hollow sphere concentration/spacing as discussed above. The mixture of resin granules and hollow spheres can then be placed in a furnace at 120° C. for 1-2 hours in order to facilitate the removal of any trapped moisture. The mixture can then be passed through an extruder while heating the mixture up to temperatures of 220-270° C., thereby drawing a wire of 2-4 mm diameter and composed of hollow spheres within a continuous resin matrix. The mixture may be passed through the extruder multiple times, which may serve to increase the uniformity of the distribution of hollow spheres within the resin matrix. The wire thus drawn can then be chopped into smaller granules, which can be dried at 120° C. for 2-5 hours. Finally, the chopped granules can be used in an injection molding process, which injection molding can be done at a pressure of 16,000-20,000 psi and a temperature of 240-270° C.

Figure 14:
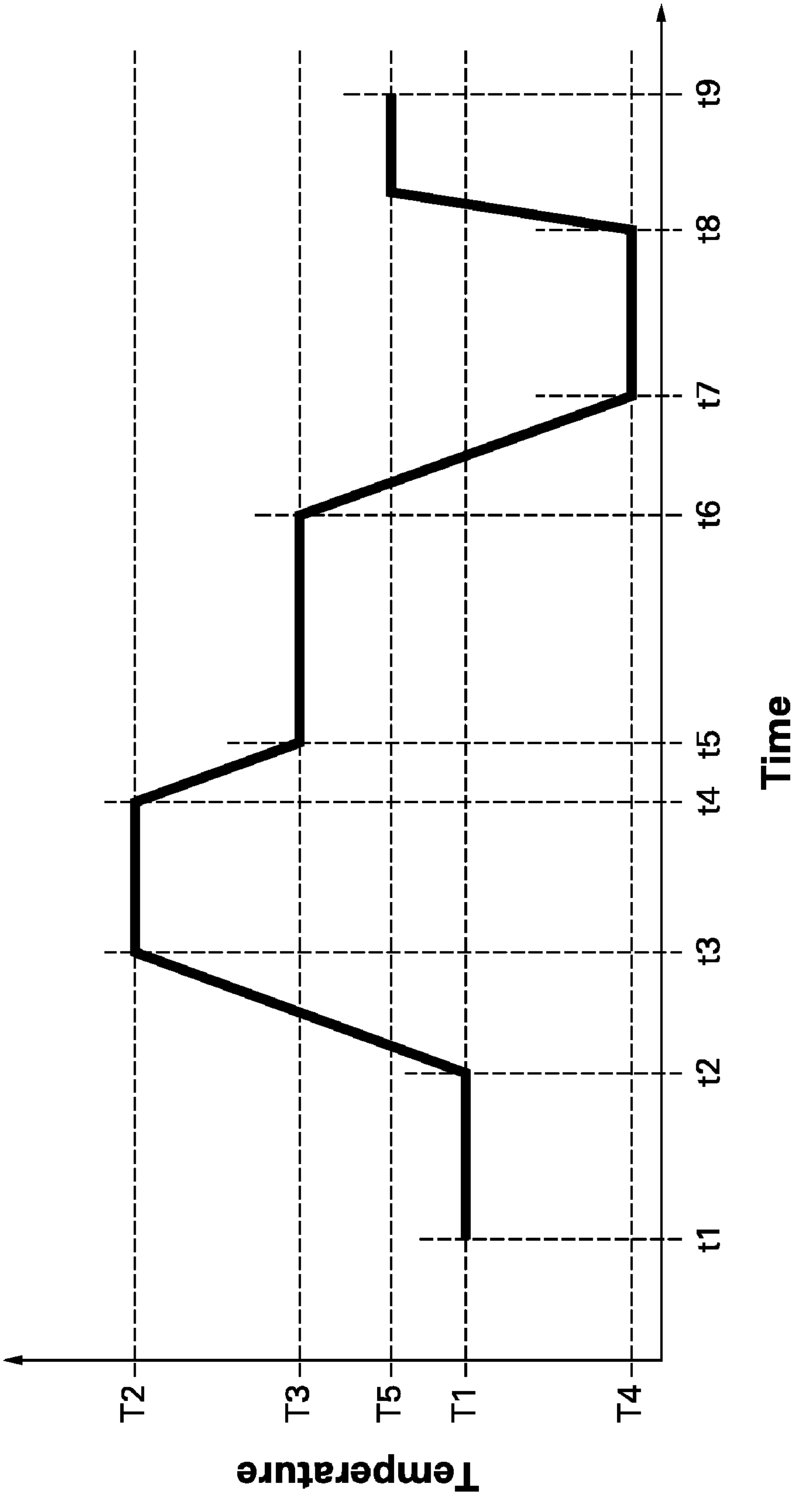
FIGS. 14 and 15 are schematic representations of a method for making an insulation composition configured in accordance with an example embodiment.
Figure 15:
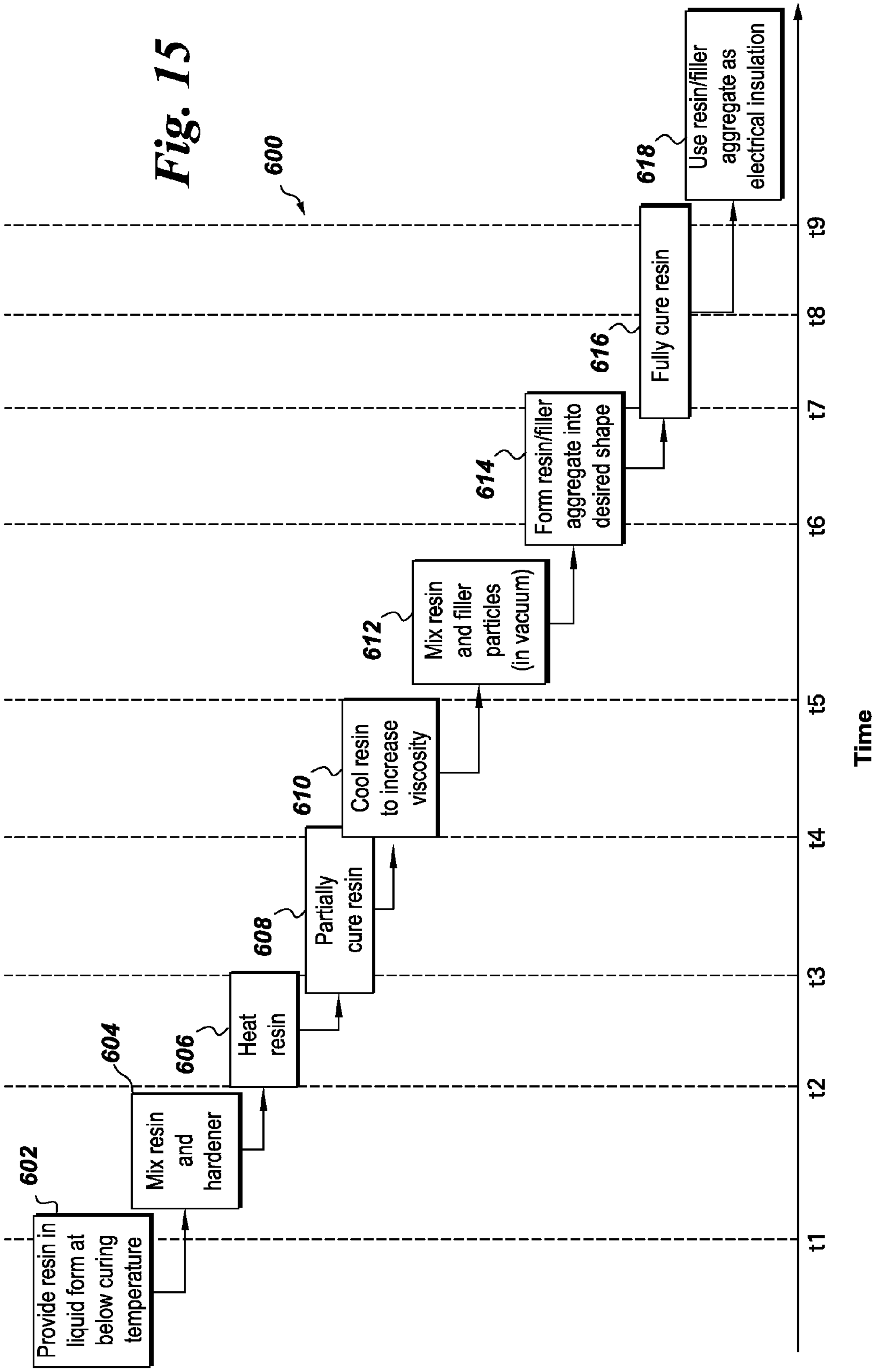

Referring to FIGS. 14 and 15, another process 600 for producing an insulation material configured in accordance with an example embodiment (e.g., the insulation material 220 of FIGS. 6-10) is now presented. Initially (at times earlier than t1), a resin can be provided in liquid form and at a first temperature T1 that is less than a second temperature (e.g., T2) at which significant curing of the resin takes place (602). The resin may be a dielectric material, and may include a thermoplastic, a thermoset, and/or an elastomeric material. The liquid resin can be mixed (say, from time t1 to t2) with a hardener (604) and then thermal energy can be applied to the resin in order to heat the resin (say, over a time from t2 to t3) to the second temperature T2 at which significant curing of the resin takes place (606).

The resin can be maintained at the second temperature T2 for a time long enough (say, from t3 to t4) to allow for partial curing (also referred to as "B-stage curing") of the resin (608). At this point, the resin may form a semisolid. Subsequently (say, from time t4 to t5), filler particles can be mixed with the partially-cured resin (612), for example, in a planetary mixer. The resin and filler particles can be mixed sufficiently to disperse the filler particles within the resin so as to have a level of uniformity of, say, at least one on the Morishita index. The mixing of filler particles and resin may be performed while exposing the resin to an ambient pressure less than atmospheric pressure (i.e., at some level of vacuum), which may help to eliminate any unintended inclusion of gases in the composition. Prior to mixing filler, the partially-cured resin can be cooled to a third temperature T3 so as to increase the viscosity of the resin (610).

The filler particles can be chosen so as to affect the electrical performance of the insulation composition in a variety of ways, as described above. For example, the filler particles may define voids, such as where the filler particles include hollow spheres of glass, hollow spheres of polymer, hollow spheres of aluminum oxide, hollow spheres of silicon dioxide, hollow spheres of titanium dioxide, and/or hollow spheres of zinc oxide. The filler particles can include particles that are substantially spherical, substantially spheroidal, substantially ovoidal, and/or substantially egg-shaped. Regardless of shape, the filler particles may have respective diameters of about 100 μm or less. In some cases, the resin can be mixed with a second type of filler particle, such that the resin includes multiple types of fillers. The second filler particles can include, for example, a ceramic, a varistor, and/or an inorganic dielectric.

Once the resin has been mixed with filler particles, the resin/filler particle aggregate can be formed into a desired shape (614) and fully cured (616). The resin can be fully cured by exposing the resin to a fourth temperature T4 that is less than the second temperature T2. In some cases, the fourth temperature T4 may be about equal to room temperature. In other cases, the fourth temperature T4 may be elevated with respect to room temperature, or the resin may be exposed to a temperature profile that varies over time, say, being exposed to a fourth temperature T4 from t7 to t8 and then a fifth temperature T5 from t8 to t9. The fifth temperature T5 can be greater than T4. For example, if the amount of curing of the resin during the times from t3 to t8 is sufficient to inhibit the subsequent segregation of filler particles in the resin matrix, the temperature T5 can be relatively close to the curing temperature T2.

Once the resin/filler aggregate has been formed into the desired shape and fully cured, the aggregate can be used as electrical insulation material (618). For example, the fully-cured resin can be disposed between the first and second conductive components configured to be maintained at different electrical potentials, such as where the conductive components are, respectively, a phase conductor and one of a phase conductor or a ground conductor.

As mentioned earlier, insulation compositions configured in accordance with example embodiments (e.g., the insulation material 220 of FIGS. 6-10) may demonstrate enhanced electrical breakdown strength. More specifically, as the insulation composition is exposed to an electric field, charges may be induced on filler particles included in the surrounding polymer matrix, with the charges in the vicinity of one filler particle interacting with those in the vicinity of an adjacent filler particle. This, in turn, causes the associated electric stress to be supported more in the matrix than in the filler particles, which matrix may be chosen so as to be capable of withstanding relatively higher electric stress. Because the interactions of charges between adjacent filler particles is one of the underlying mechanisms leading to enhanced breakdown strength, insulation performance is a function of the uniformity of the distribution of filler particles within the surrounding matrix.

Applicants have discovered that the mixing of filler particles (e.g., hollow spheres) with uncured resin can result in a highly non-uniform distribution of filler particles within the final (cured) resin matrix. This non-uniformity may be due to the difference in density between the filler particles and the liquid resin, which density difference may cause the filler particles to settle down or float on the surface of the resin during mixing. Applicants have further discovered that embodiments of the process described above may alleviate these issues by increasing the effective viscosity of the resin before mixing and therefore reducing the rate at which the filler particles and resin separate due to density differences and enhancing the uniformity of the filler particles in the final (cured) resin matrix.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A method comprising:

providing a resin in liquid form;

partially curing the resin; and subsequent to said partially curing the resin, mixing the resin and filler particles, said filler particles being hollow spheres distributed within said resin to define voids, wherein said voids are configured as a substantially uniform array, thereby forming an insulation layer.

2. The method of claim 1, wherein said providing a resin in liquid form includes providing a dielectric resin in liquid form.

3. The method of claim 1, wherein said providing a resin in liquid form includes providing one or more of a thermoplastic resin, a thermosetting resin, or an elastomeric resin in liquid form.

4. The method of claim 1, wherein said partially curing the resin includes forming a semisolid.

5. The method of claim 1, wherein said partially curing the resin includes applying thermal energy to the resin.

6. The method of claim 1, wherein said mixing the resin and filler particles includes mixing the resin and filler particles in a planetary mixer.

7. The method of claim 1, wherein said mixing the resin and filler particles includes mixing the resin and filler particles sufficiently to disperse the filler particles within the resin so as to have a level of uniformity of at least one on the Morishita index.

8. The method of claim 1, wherein said mixing the resin and filler particles includes mixing the resin and filler particles while exposing the resin to an ambient pressure less than atmospheric pressure.

9. The method of claim 1, said mixing the resin and filler particles includes mixing the resin and filler particles that include at least one of hollow spheres of glass, hollow spheres of polymer, hollow spheres of aluminum oxide, hollow spheres of silicon dioxide, hollow spheres of titanium dioxide, or hollow spheres of zinc oxide.

10. The method of claim 1, wherein said mixing the resin and filler particles includes mixing the resin and filler particles that are at least one of substantially spherical, substantially spheroidal, substantially ovoidal, or substantially egg-shaped.

11. The method of claim 1, wherein said mixing the resin and filler particles includes mixing the resin and filler particles that have respective diameters of about 100 μm or less.

12. The method of claim 1, further comprising mixing a hardener with the resin in liquid form.

13. The method of claim 1, further comprising mixing the resin with second filler particles.

14. The method of claim 13, wherein said mixing the resin with second filler particles includes mixing the resin with second filler particles that include at least one of a ceramic, a varistor, or an inorganic dielectric.

15. The method of claim 1, wherein the array comprises voids having one or more close-packed directions.

16. The method of claim 15, wherein the close-packed directions are oriented obliquely relative to an electric field.

17. The method of claim 1, further comprising fully curing the resin subsequent to said mixing the resin and filler particles.

18. The method of claim 17, further comprising:

providing a device having first and second conductive components configured to be maintained at different potentials; and disposing the fully-cured resin between the first and second conductive components.

19. The method of claim 18, wherein said providing a device having first and second conductive components configured to be maintained at different potentials includes providing a device having a first conductive component that includes a phase conductor and a second conductive component that includes one of a phase conductor or a ground conductor.

20. The method of claim 17, wherein said providing a resin in liquid form includes providing a resin in liquid form at a first temperature, said partially curing the resin includes exposing the resin to a second temperature greater than the first temperature, said mixing the resin and filler particles includes mixing the resin and filler particles while exposing the resin to a third temperature less than the second temperature, and said fully curing the resin includes exposing the resin to a fourth temperature less than the second temperature.

21. The method of claim 20, wherein said exposing the resin to a fourth temperature less than the second temperature includes exposing the resin to a fourth temperature that is about equal to room temperature.

* * * * *